United States Patent  (10) Patent No.: US 9,159,180 B2
Paterson et al.  (45) Date of Patent: Oct. 13, 2015

(54) MEDIA CONVEYING

(75) Inventors: Roderick George Paterson, Perthshire (GB); Michael Clayton, Perth (GB)

(73) Assignee: NCR Corporation, Duluth, GA (US)

( * ) Notice: Subject to any disclaimer, the term of this patent is extended or adjusted under 35 U.S.C. 154(b) by 292 days.

(21) Appl. No.: 13/331,457

(22) Filed: Dec. 20, 2011

(65) Prior Publication Data

US 2013/0154460 A1   Jun. 20, 2013

(51) Int. Cl.
*G07F 9/10* (2006.01)
*G07D 11/00* (2006.01)

(52) U.S. Cl.
CPC ........ *G07D 11/0009* (2013.01); *G07D 11/0012* (2013.01); *G07D 11/0018* (2013.01); *G07D 11/0081* (2013.01); *Y10T 29/49716* (2015.01)

(58) Field of Classification Search
CPC ..... G07F 19/20; G07F 19/201; G07F 19/205; G07F 19/202; G07F 19/207; G07F 7/08; G07F 7/1008; G07F 17/32; G07F 17/0014; G07F 7/025; G07F 17/3281; G07F 7/04; G07F 9/06; G07F 9/10; G07F 11/44; G07D 11/0096; G07D 11/0081; G07D 11/0018; G07D 11/0009; G07D 11/0006; G07D 11/0003; G07D 7/12; G07D 7/20; G07D 7/04; G07D 9/00; G06Q 20/1085; G06Q 40/00; G06Q 20/04; G06Q 20/042; G06Q 40/02; G06Q 20/20; G06Q 20/10; G06Q 20/108; G06Q 20/18; G06Q 20/06; G06Q 20/02; G06Q 20/367; G06Q 20/3672; B65G 51/04; B65G 47/82; B65G 47/766; B65H 2701/1912; B65H 7/12; B65H 7/125; B65H 31/3009; B42D 9/04; B41J 3/28; B41J 11/50; G06K 13/08; A47G 29/14; E04H 14/00; E04H 1/06; E04B 1/3431; E05G 5/02; C03B 9/453; A24C 5/326; B21B 43/003
USPC ........ 194/206, 207, 350; 209/534; 902/8–24, 902/30–35, 41; 198/468.01, 468.9; 235/379; 382/135

See application file for complete search history.

(56) References Cited

U.S. PATENT DOCUMENTS

| | | | | | |
|---|---|---|---|---|---|
| 4,735,289 | A | * | 4/1988 | Kenyon | 186/37 |
| 4,775,783 | A | * | 10/1988 | Sasaki et al. | 235/379 |
| 4,820,909 | A | * | 4/1989 | Kawauchi et al. | 235/379 |
| 4,858,743 | A | * | 8/1989 | Paraskevakos et al. | 194/205 |
| 4,884,698 | A | * | 12/1989 | Tutamune et al. | 209/534 |
| 5,019,249 | A | * | 5/1991 | Sugai et al. | 209/534 |
| D323,648 | S | * | 2/1992 | Yamamoto | D14/105 |
| 5,101,979 | A | * | 4/1992 | Uno et al. | 209/534 |
| 5,183,999 | A | * | 2/1993 | Hakenewerth et al. | 235/379 |
| 5,250,788 | A | * | 10/1993 | Sugai et al. | 235/379 |
| 5,436,435 | A | * | 7/1995 | McMillan | 235/379 |
| 5,440,999 | A | * | 8/1995 | Dallman et al. | 109/24.1 |
| 5,593,149 | A | * | 1/1997 | Kimura et al. | 271/3.01 |
| 5,804,804 | A | * | 9/1998 | Fukatsu et al. | 235/379 |

(Continued)

*Primary Examiner* — Jeffrey Shapiro
(74) *Attorney, Agent, or Firm* — Joseph P. Mehrle

(57) ABSTRACT

A method and apparatus are disclosed for conveying at least one item of media. The apparatus includes a user interface comprising a media port and a user display. The apparatus also includes a shuttle carriage supporting a presentation platform and movable along a shuttle drive rail between a first end region thereof in which the presentation platform can be aligned at the media port and a further end region in which the presentation platform can be selectively aligned with a selected one of a plurality of possible handling ports of a multi-media station.

14 Claims, 11 Drawing Sheets

(56) References Cited

U.S. PATENT DOCUMENTS

| | | | |
|---|---|---|---|
| 6,024,531 A * | 2/2000 | Schulze | 414/790.2 |
| 6,036,089 A * | 3/2000 | Oguchi et al. | 235/379 |
| 6,042,003 A * | 3/2000 | Bigge et al. | 235/379 |
| 6,086,065 A * | 7/2000 | Svensson | 271/298 |
| 6,296,079 B1 * | 10/2001 | McNaughton | 186/37 |
| 7,162,329 B2 * | 1/2007 | Dimitri et al. | 700/214 |
| 7,624,977 B2 * | 12/2009 | Lee et al. | 271/3.01 |
| 7,644,039 B1 * | 1/2010 | Magee et al. | 705/43 |
| 8,100,244 B2 * | 1/2012 | Stapfer | 194/206 |
| 8,146,804 B2 * | 4/2012 | Kong et al. | 235/379 |
| 8,261,903 B2 * | 9/2012 | Deas et al. | 194/344 |
| 2002/0023954 A1 * | 2/2002 | Calder et al. | 235/381 |
| 2002/0091464 A1 * | 7/2002 | Dimitri et al. | 700/214 |
| 2004/0079683 A1 * | 4/2004 | Utz et al. | 209/534 |
| 2004/0148716 A1 * | 8/2004 | Hutton | 14/71.5 |
| 2006/0076213 A1 * | 4/2006 | Sekiguchi et al. | 194/206 |
| 2006/0104497 A1 * | 5/2006 | Jespersen et al. | 382/135 |
| 2008/0283450 A1 * | 11/2008 | Hemming et al. | 209/534 |
| 2009/0166957 A1 * | 7/2009 | Kong et al. | 271/198 |
| 2010/0126805 A1 * | 5/2010 | Oh | 186/37 |
| 2010/0170911 A1 * | 7/2010 | Gunst et al. | 221/1 |
| 2012/0160860 A1 * | 6/2012 | Milne et al. | 221/1 |
| 2012/0279982 A1 * | 11/2012 | Cha et al. | 221/1 |
| 2012/0280034 A1 * | 11/2012 | Cha et al. | 235/379 |

* cited by examiner

MEDIA CONVEYING

FIELD OF THE INVENTION

The present invention relates to a method and apparatus for conveying at least one item of media. In particular, but not exclusively, the present invention relates to the conveyance of items of media such as currency notes between a user interface and a multi-media station. A shuttle conveys items of media between the user interface and a selected one of many possible handling ports of the multi-media station.

BACKGROUND TO THE INVENTION

Media dispensers and media depositories are known. Media depositories are used to receive items of media from a customer. A common type of media depository is a sheet media depository for receiving items of media in sheet form. For example, such items of media can be currency notes, cheques, tickets, giros, receipts or the like.

Some sheet depositories are capable of receiving a bunch of sheets in a loading area and then picking individual sheets from the bunch so that each sheet can then be identified and validated individually prior to storage of the validated sheet within a depository or returned to a customer. Bunches of items of media such as currency notes and/or cheques or the like are thus deposited by a user and, subsequent to a user agreement step and item verification step, these items are stored semi-permanently within a self-service terminal until security staff or bank staff come to empty a storage unit. Such storage units are often referred to as stacking bins. Alternatively, when an input item is identified as being an illicit or damaged item, the item is stored in a storage unit referred to as a reject bin.

Media dispensers are used to provide media items to a customer. Typically a user visits a user interface and, via the interface, requests one or more items of media. These are temporarily stored in one or more cassettes and subsequent to user verification may be selectively dispensed to the user/customer.

Media dispensers and/or media depositories may be found in a wide range of self-service terminals. Such terminals may be teller machines, teller assist units or the like. An increasing range of features and functionality is being offered by self-service terminals. This is creating challenges in terms of product usability, security and privacy. In addition, some financial institutions wish to use an automated teller machine (ATM) or other self-service terminal to create brand recognition and showcase innovation.

However, when a self-service terminal such as an ATM is to be provided with increased functionality, the complexity of the device increases accordingly. A user is thus faced with a confusing choice during a transaction. For example, if a multi-media station which might be able to store or dispense multiple types of items of media is to be accessed by a user, a user can be confused as to which input or output port items of media are to be input at or dispensed from. This can lead to user error and ultimately transaction failure. This can also provide a user with an unpleasant experience.

A custom-built self-service terminal is known that provides a single slot deposit/dispense media interface separated from a secure unit containing a dispenser and/or depository and linked thereto by a robotic arm. This custom-built terminal is very expensive and difficult to install because of its size and shape. It also requires very accurate alignment between the robotic arm and the slots in the secure unit.

SUMMARY OF THE INVENTION

It is an aim of the present invention to at least partly mitigate the above-mentioned problems.

It is an aim of certain embodiments of the present invention to provide a method and apparatus that provides a customer with a user interface which is simple to understand but which is connected to a multi-media station so that a full functionality of enabling a customer to deposit different types of media or have different types of media dispensed to them is provided for.

It is an aim of certain embodiments of the present invention to provide a method and apparatus for conveying items of media whereby a user interface which includes a single media port and user display is used as a dispensing or deposit point and a shuttle carriage conveys items of media between that user interface and a multi-media station.

It is an aim of certain embodiments of the present invention to provide a "bolt-on" shuttle system that allows a "traditional" self-service cabinet to be used as a platform for a highly simplified customer front end. For example, such a front end may feature only a single media port.

It is an aim of certain embodiments of the present invention to provide a mechanism that allows a brand new user interface to be retrofitted to a traditional back office carcass which acts as a multi-media station.

According to a first aspect of the present invention, there is provided apparatus for conveying at least one item of media, comprising:
 a user interface comprising a media port and a user display; and
 a shuttle carriage supporting a presentation platform and movable along a shuttle drive rail between a first end region thereof in which the presentation platform can be aligned at the media port and a further end region in which the presentation platform can be selectively aligned with a selected one of a plurality of possible handling ports of a multi-media station.

Aptly, the presentation platform has at least three degrees of freedom.

Aptly, the presentation platform has a first direction of possible motion horizontally along a longitudinal axis of the drive rail, a second direction of possible motion comprising vertically perpendicular to the horizontal motion and a third direction of possible motion tilting about a central longitudinal axis of the platform.

Aptly, the apparatus further includes a shuttle housing that houses the shuttle carriage and drive rail and that supports the user interface at a first end region of the housing.

Aptly, the apparatus includes at least one connector at a second end region of the shuttle housing to secure the shuttle housing to the multi-media station.

Aptly, the apparatus further includes at least one support element extending from the shuttle housing that supports the housing and user interface at a desired distance above a floor surface.

Aptly, the shuttle carriage comprises at least one servo motor for driving the carriage along the drive rail.

Aptly, the shuttle carriage comprises at least one stepper motor for locating the presentation platform at a desired height above the drive rail.

Aptly, the shuttle carriage comprises at least one stepper motor for locating the presentation platform at a desired angle with respect to a horizontal plane.

Aptly, the multi-media station comprises a front end region of a carcass of an automated teller machine (ATM).

Aptly, the media port comprises only one media port and said user display comprises a touchscreen display panel.

Aptly, the plurality of handling ports comprises at least one printed receipt port and at least one currency dispensing port and at least one item deposit port.

According to a second aspect of the present invention, there is provided a method of retro-fitting a user interface to an automated teller machine (ATM), comprising the steps of:
- removing a fascia panel to provide access to a front end region of a carcass of an ATM; and
- securing a shuttle housing to the front end region, said housing supporting a user interface comprising a media port and a user display.

Aptly, the method further includes the step of supporting the media port and user display facing a direction opposite to a previous facing direction of the fascia panel.

According to a third aspect of the present invention, there is provided an automated teller machine (ATM), comprising:
- a user interface comprising a single media port and a user display; and
- a shuttle system comprising a carriage that locates items of media at the single media port or at a selected one of a plurality of possible handling ports of a multi-media station.

Certain embodiments of the present invention provide a way in which a traditional self-service cabinet such as a traditional back-office carcass can be connected to a highly minimalized customer front end.

Certain embodiments of the present invention enable traditional and well defined self-service device arrays to be maintained including re-use of expensive security enclosures.

Certain embodiments of the present invention provide financial institutions with a mechanism which enables them to develop highly customised user interfaces, possibly with strong branding and embracing modern graphic interfaces.

Certain embodiments of the present invention provide a multi-media station that houses a stable set of self-service modules which may be mounted in a standardised and secure environment.

Certain embodiments of the present invention provide the advantage that items of media may be conveyed between a user interface and a multi-media station via a shuttle system. The shuttle system can be aligned with one of many possible handling ports in the multi-media station and yet will shuttle to a user interface where items of media may be deposited or dispensed at only one or only a few media ports. This helps avoid customer confusion.

According to a fourth aspect of the present invention, there is provided apparatus for coupling to a self-service terminal to provide a remote media interface, the apparatus comprising:
- a user interface comprising a media port and a user display; and
- a shuttle carriage supporting a presentation platform and movable along a shuttle drive rail between a first end region thereof in which the presentation platform can be aligned at the media port and a further end region in which the presentation platform can be selectively aligned with a selected one of a plurality of possible handling ports of a self-service terminal.

The self-service terminal may comprise an alignment sensor at each port with which the shuttle carriage is to align, and the shuttle carriage may include a complementary sensor for detecting and identifying each alignment sensor on the self-service terminal.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
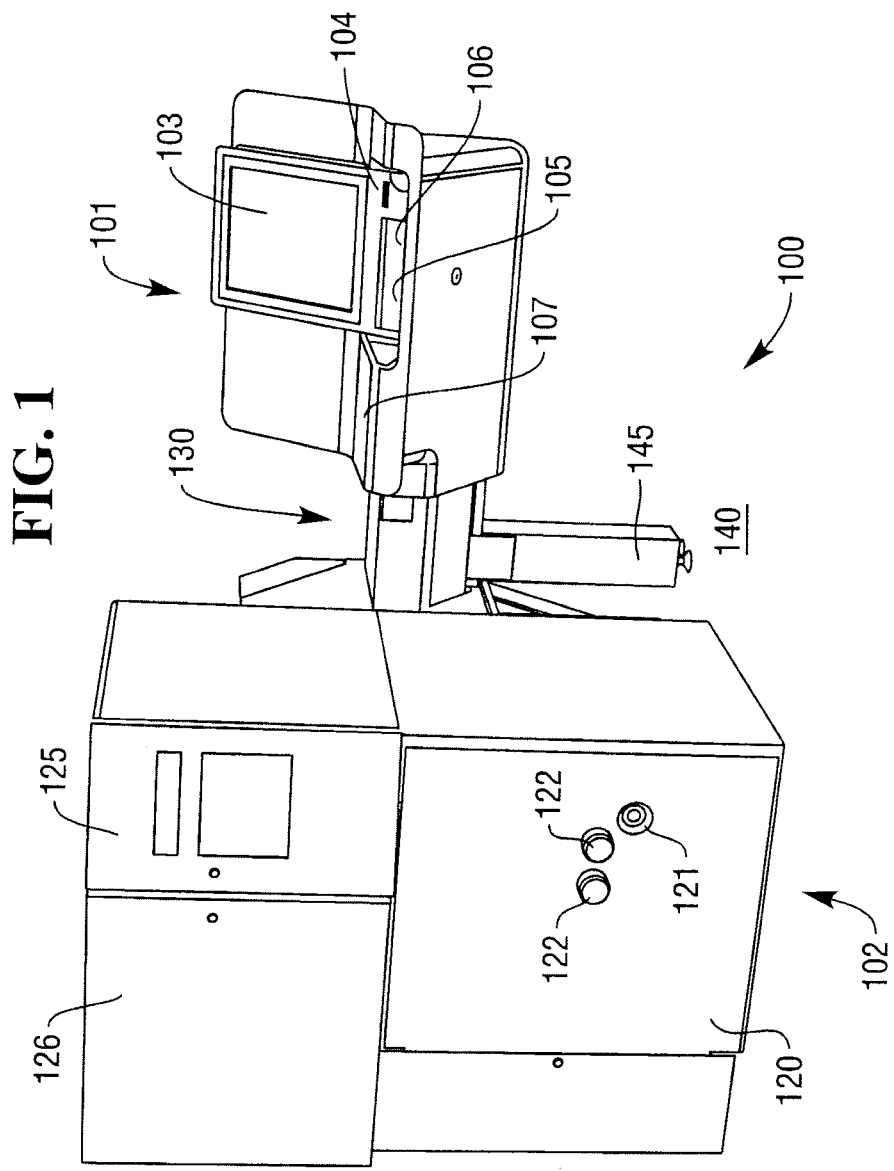
FIG. 1 is a schematic diagram of an ATM according to an embodiment of the present invention.

In the drawings like reference numerals refer to like parts.

FIG. 1 illustrates an automated teller machine (ATM) 100 according to an embodiment of the present invention. The ATM includes a user interface 101 which is connected to a multi-media station 102 such as a self-service cabinet. The user interface 101 includes a touchscreen user display 103 which enables a user such as a customer of a financial institution to stand facing the screen 103 and make selections by selecting displayed icons or the like which will be appreciated by those skilled in the art. The user interface 101 also includes a card reader slot 104 which enables a user to input a customer card to verify a customer identity and an account associated with a transaction to be carried out. The user interface 101 also includes a single media port 105. Optionally, multiple posts may be provided on the user interface. The media port 105 has a security flap 106 which selectively opens and closes to provide access to a transfer region where items of media may be dispensed or deposited. It will be appreciated that a broad range of types of items or media may be deposited or dispensed through the single media port 105. For example, currency notes or printed receipts or vouchers or cheques or other such items or the like may be dispensed. Similar items may likewise be deposited by a user. A shelf 107 is provided for a user's convenience so that they can rest on the shelf whilst carrying out a transaction or utilise the shelf when filling in certain documentation. One or more privacy screens (not shown in FIG. 1) may be utilised so that a transaction can be carried out in a secure manner. The user interface 101 is connected to a multi-media station 102. This includes a secure safe door 120 which is accessible by authorised staff by a combination lock 121 and handles 122.

A further lockable door 125 is provided in the top right hand corner (as shown in FIG. 1) of the multi-media station and provides a user with access to secure storage space. A further securable door 126 is provided in the top left hand side of the multi-media station as shown in FIG. 1. This likewise provides access to a further secure storage space of the ATM.

The user interface and multi-media station are connected via a shuttle housing 130 which is supported on a floor surface 140 by a support leg 145. The length of the support leg 145 is adjustable so that the shuttle housing 130 and user interface 101 secured thereto are duly arranged at a desired height above the floor surface 140. The shuttle housing 130 houses a shuttle system which shuttles between the user interface and the multi-media station to transfer items of media either singly or in bunches to and from the user interface and the multi-media station.

Figure 2:
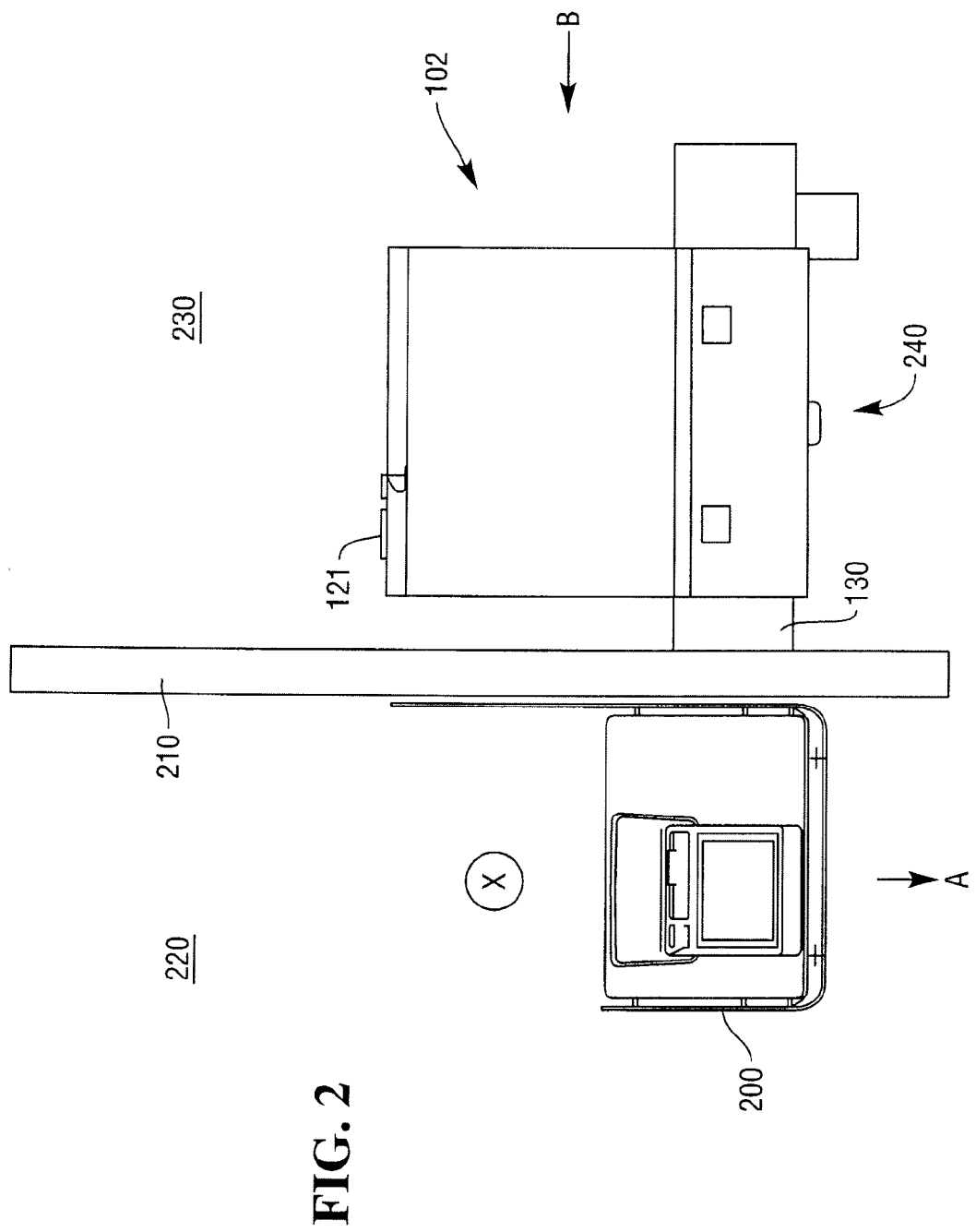
FIG. 2 illustrates a schematic diagram showing a user interface separated by a wall from a multi-media station.

FIG. 2 illustrates the ATM shown in FIG. 1 from above and in more detail. A user such as a customer of a financial institution stands at the position X facing the user display 103. In this sense the user faces towards the bottom of the page in the direction shown by arrow A. The user can carry out a secure transaction because their input and output actions on the user display are shielded by a courtesy screen 200. The courtesy screen extends in a substantially U-shape to one side of the user interface, behind the user interface and is secured to a wall 210 which is located adjacent to the user interface. In this sense it will be appreciated that a first region 220 where the user stands forms part of a room on a first side of the wall whilst a further spaced apart region 230 forms part of a room on a further side of the wall 210. Access to the region 220 where the user interface is located may be open to the public or to other authorised users of a financial institution facility. Access to the region 230 where the multi-media station 102 is located may be restricted. As illustrated in FIG. 2, the shuttle housing 130 is located so as to connect to the user interface and passes through a hole in the wall 210 to a rear 240 of the multi-media station. The provision of a secure wall 210 between the user interface and the multi-media station where items of media are stored for subsequent dispensation or subsequent to deposit by a user, thus maintains a pleasant appearance to the publicly available area 220. Meanwhile, authorised personnel have access to the secure zone 230 where they may attend to the carcass of the multi-media station to keep currency cassettes or the like topped up, or printer paper or the like topped up, or carry out other authorised activity.

Figure 3:
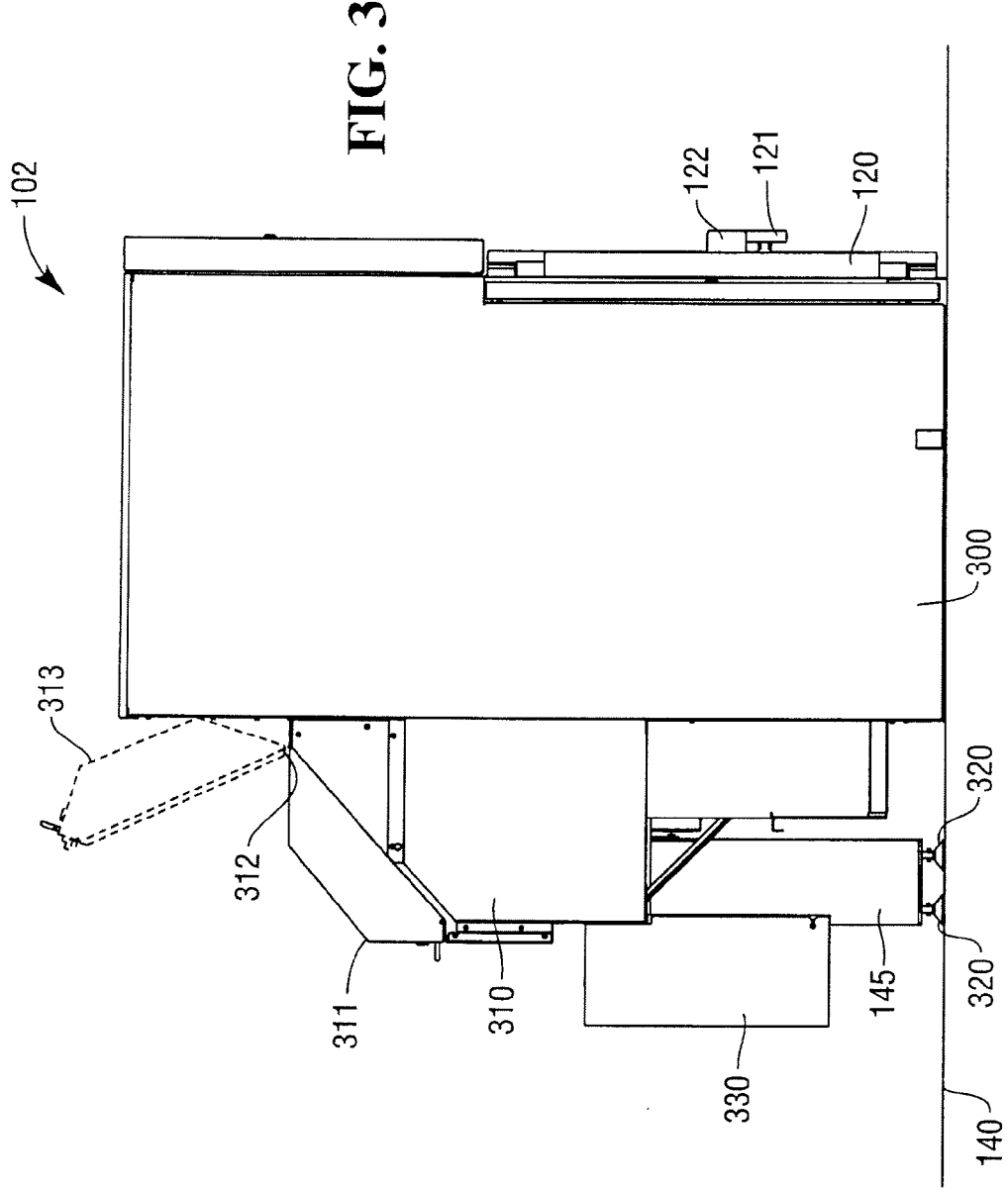
FIG. 3 illustrates a side view of the ATM shown in FIG. 1.

FIG. 3 illustrates a side view of the ATM 100. In particular, the view shown in FIG. 3 is taken in the direction of arrow B in FIG. 2.

The multi-media station 102 stands on a floor surface 140. The multi-media station 102 is substantially box-like and may be provided by a bespoke housing or may be a traditional carcass of a traditional ATM. A side 300 is illustrated in FIG. 3 of the multi-media station. FIG. 3 also illustrates how the safe door 120 and handles and security lock 121 extend outwards towards the front of the multi-media station.

As shown in FIG. 3, the shuttle housing 130 extends into a shuttle bay 310 which has a lid 311 which is pivotable about a point 312 and can be opened by a user into an open position 313 shown by the dotted line in FIG. 3. By opening the lid 311, a user is provided with access to multiple handling ports at the rear of the multi-media station. These are shown and described later. The shuttle housing stands on a leg 145 which is adjustable in length by means of adjusters 320. A housing 330 for a motor is also illustrated in FIG. 3. The motor is a 3-phase synchronous servo motor which drives a shuttle carriage supporting a presentation platform along a drive rail housed in the shuttle housing. Other types of drive motor could of course be utilised. The drive rail is located longitudinally in a direction into and out of the page as shown in FIG. 3. The shuttle carriage which supports the presentation platform can thus be driven from a first end in which the presentation platform can be aligned at the media port of the user interface and a further end region within the bay 310 at the rear of the multi-media station where the presentation platform can be raised or lowered and tilted so as to align with a selected one of a plurality of possible handling ports. In this way, items of media such as currency notes, cheques, vouchers, printed receipts or the like may be transferred between the single port of the user interface and the multiple ports of the multi-media station. More than one port on the user interface could of course be utilised with the shuttle carriage and presentation platform being alignable at a selected one of a plurality of the possible ports on the user interface.

Figure 4:
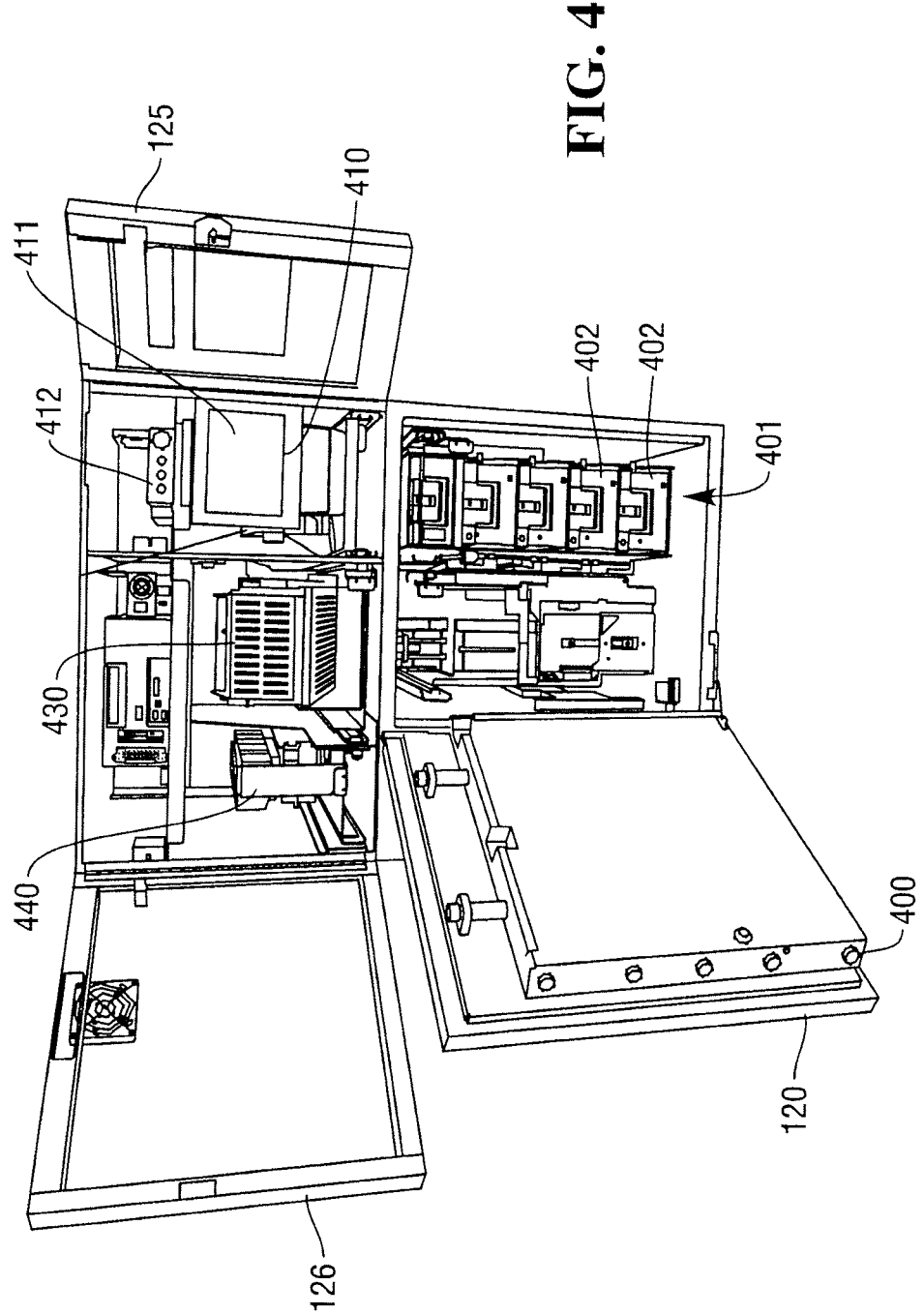
FIG. 4 illustrates self-service modules in a multi-media station.

FIG. 4 illustrates the front of a multi-media station 102 with the various security doors 120, 125, 126 open. As shown in FIG. 4, the main security enclosure door 120 provides a safe door with bolts 400 which locate in associated recesses (not shown) in the safe compartment 401 of the multi-media station. This thus provides a highly secure environment for currency cassettes 402 to be located. Other modules which require safe storage may also be located within the security compartment 401.

The top right hand side cabinet which is accessed via security door 125 houses an authorised user interface 410. This includes a user display 411 and user keypad 412 via which an authorised user, such as an employee of a financial institution, can input and output data associated with operation of the multi-media station. The top left hand side compartment is provided access to via security door 126. This includes a printer 430 which can be utilised to print a roll of paper for a customer of the financial institution to thus provide a receipt of a transaction. The security cabinet accessed by the security door 126 may also enclose a further printer 440 which can be used to print other matter.

Figure 5:
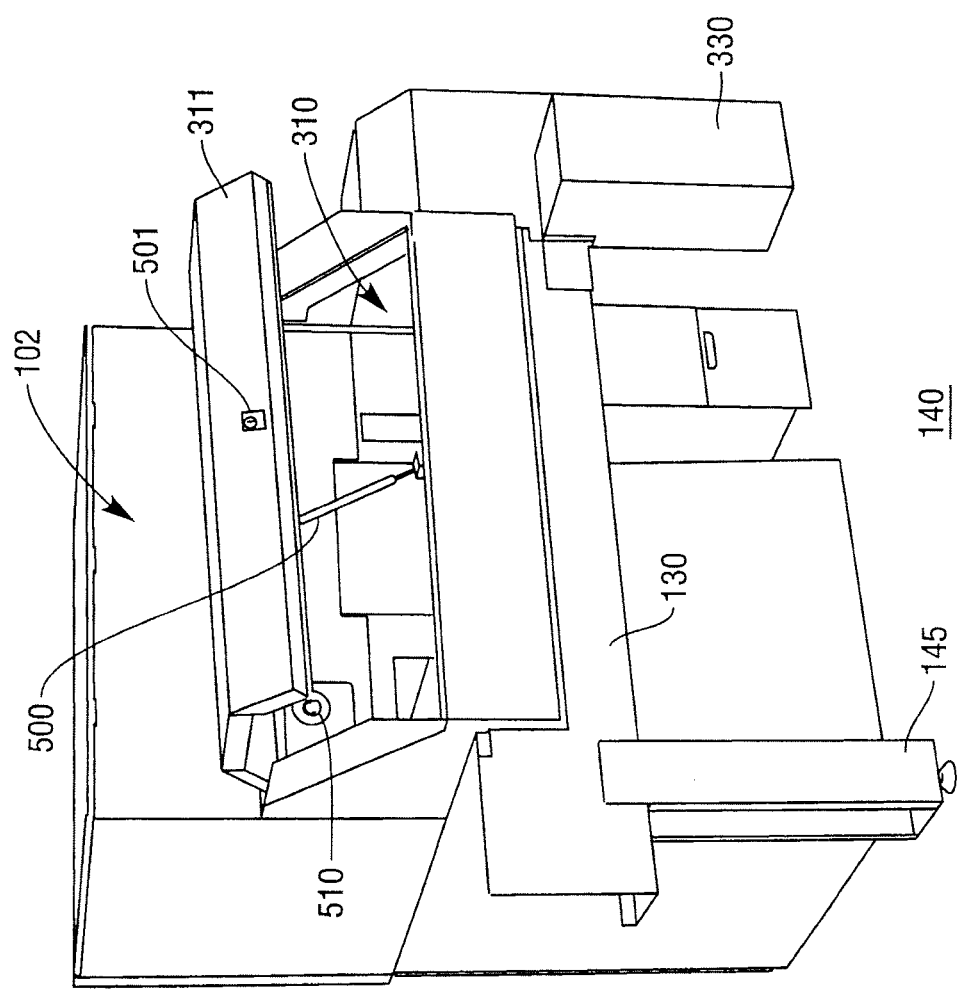
FIG. 5 illustrates an access panel to the many handling ports of a multi-media station.

FIG. 5 illustrates another view of the rear of the multi-media station in more detail. The user interface 101 and the wall 210 are not shown for clarity. The leg 145 is an elongate rigid structure which supports a shuttle housing 130 at a desired level above the floor 140. The shuttle housing 130 is an elongate substantially rectangular rigid structure which extends horizontally between the user interface and the storage bay 310. The storage bay is accessed by lifting the lid 311. A ram 500 is utilised to maintain the lid 311 at a desired open location. A lock 501 is used to secure the lid 311 in a shut state. In operation, the shuttle housing houses a shuttle carriage which rides along a shuttle drive rail in a substantially horizontal orientation between a left and right hand side position shown in FIG. 5. Because the shuttle drive operates very quickly, a cut-off switch 510 is provided so that authorised users accessing the bay area can temporarily deactivate action of the shuttle carriage.

Figure 6:
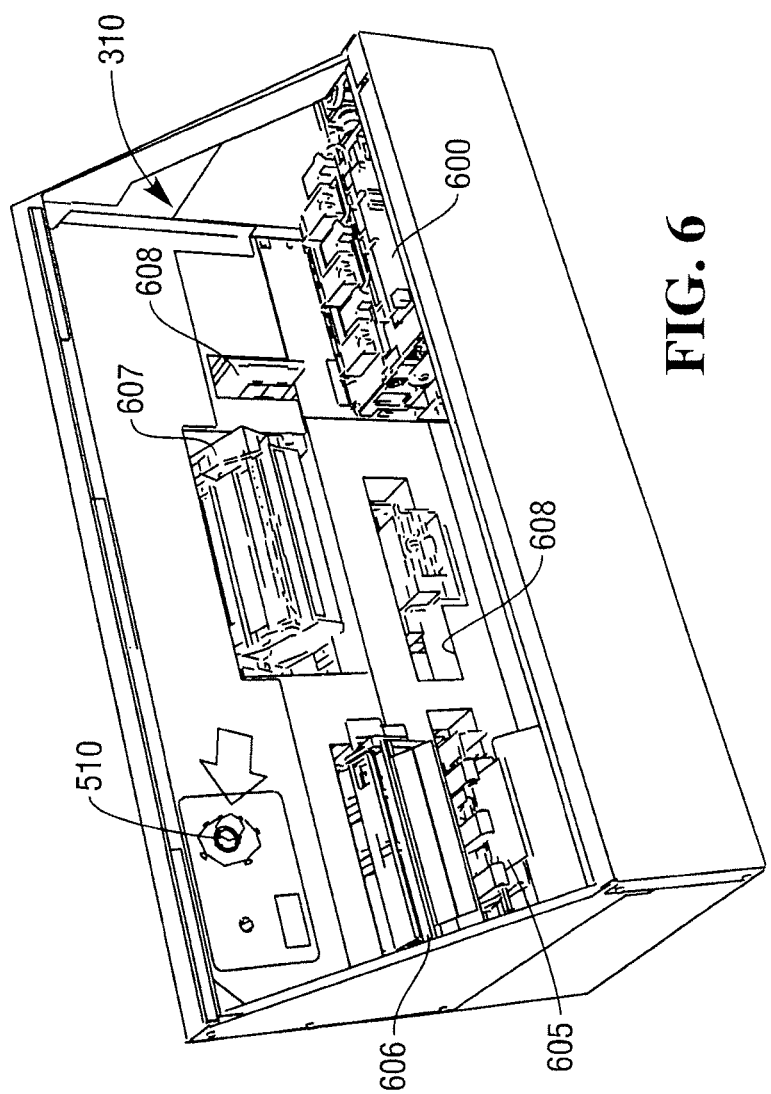
FIG. 6 illustrates the many handling ports of a multi-media station.

FIG. 6 illustrates another view of the shuttle bay 310. The cut-off switch 510 is shown in the top left hand corner which is a button which a user can press to temporarily deactivate motion of a shuttle carriage 600. This is helpful because the carriage moves rapidly between a position orientated with the user interface accessed by a computer and one of many handling ports within the shuttle bay area.

Figure 7:
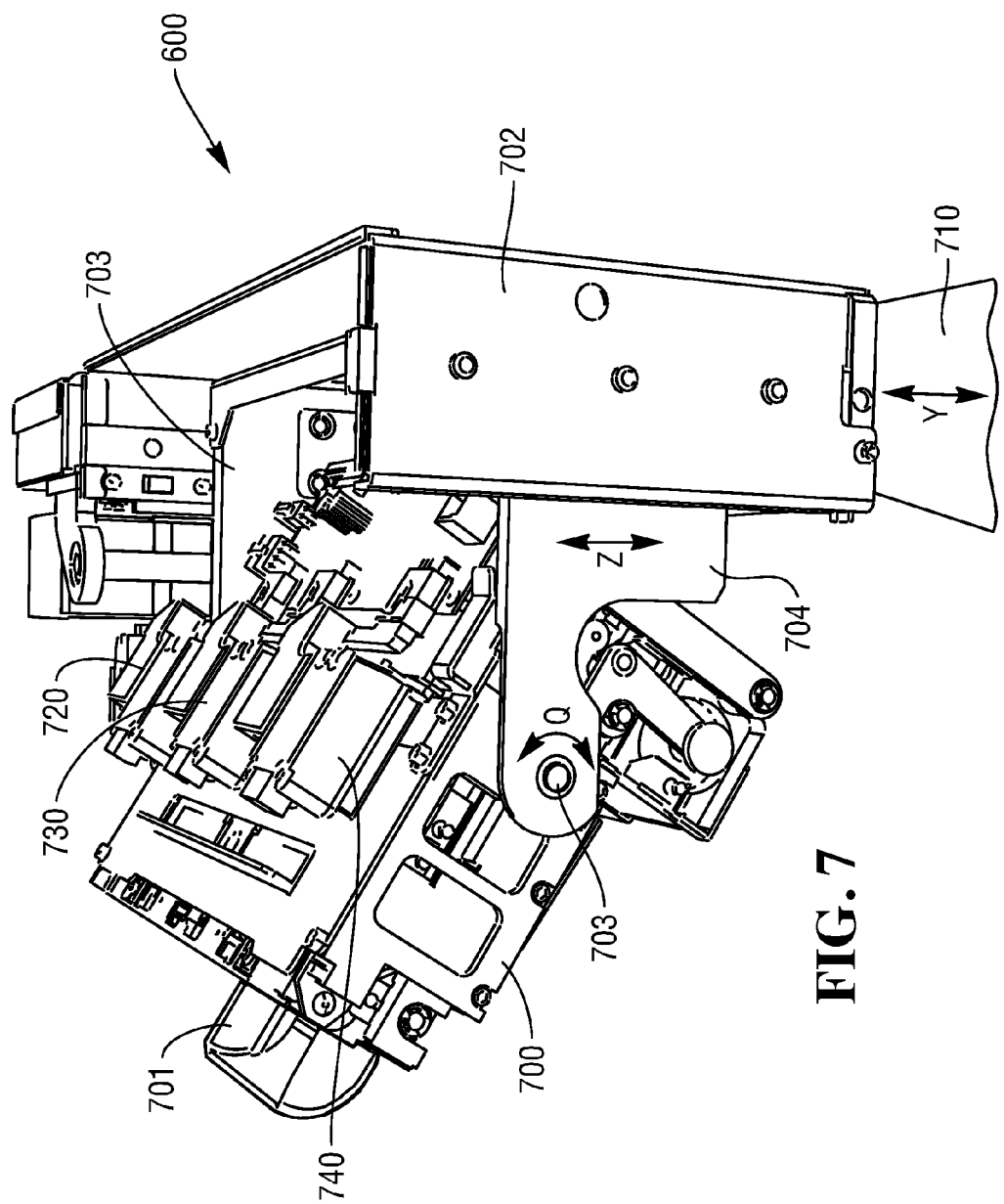
FIG. 7 illustrates a shuttle carriage and presentation platform.

Multiple handling ports are located at the rear of the multi-media station. For example, a currency dispensing port 605 is provided which enables currency notes from the currency cassettes 402 to be dispensed. A currency deposit port 606 is also provided whereby a user depositing currency notes at the user interface can make a deposit at the multi-media station. A printer outlet 607 is provided whereby a printer 430 in the multi-media station can print out details on a passbook associated with a transaction. Further possible handling ports 608 are also provided which carry out some pre-determined function which may be associated with a dispensing and/or deposit mode of operation. For example, a coin deposit and/or coin dispense port may be provided. The shuttle carriage 600 shown in FIG. 6 is shown in more detail in FIG. 7. As illustrated in FIG. 7, the shuttle carriage 600 includes a presentation platform 700 which has an input/output orifice 701 which is aligned in use with a selected one of the possible handling ports of the multi-media station or the port of the user interface. The angle of the presentation platform with respect to a shuttle carriage support 702 may be modified by rotating the presentation platform about a pivot point 703 defined by arms 704 which extend outwardly away from the shuttle carriage support 702. The height of these arms 704 is adjustable with respect to the shuttle support 702 so that the height of the presentation platform with respect to the shuttle support can be selectively set in addition to the angle of the presentation with respect to the support. The position of the shuttle carriage support 702 is itself locatable by being duly located at a selected position along a drive rail 710. Thus, the presentation platform has at least three degrees of freedom. The presentation platform has a first direction of possible motion which is horizontally along a longitudinal axis of the drive rail 710 (in the directions indicated by the straight double-ended arrow "Y" shown in FIG. 7). A second direction of possible motion is a vertical motion perpendicular to the horizontal motion whereby the support arms 704 are driven up or down with respect to the shuttle carriage support 702 and the drive rail (in the directions indicated by the straight double-ended arrow "Z" shown in FIG. 7). A third possible direction of motion comprises a tilting motion whereby the presentation platform can be tilted about a central longitudinal axis of the presentation platform defined between pivot points 703 on the spaced apart and substantially parallel carriage arms 704 (in the directions indicated by the arcuate-shaped double-ended arrow "Q" shown in FIG. 7). Optionally, a fourth degree of freedom may be provided by allowing the 'nose' of the shutter on the presentation platform to travel outwards towards the multimedia station. This helps limit the gap between the presentation platform and the ports at the rear of the multi-media station. Subsequent to transfer one or more items to or from the presentation platform the 'nose' is retracted to allow subsequent relocation of the carriage.

A drive motor (not shown) housed in the drive motor housing 330 drives the shuttle carriage support 702 rapidly to and from along the length of the drive rail. The motor is a servo motor which can precisely locate the shuttle carriage support at a desired location whereby the presentation platform is duly located in front of and proximate to a selected one of the many handling ports of the multi-media station. The presentation platform itself includes three further stepper motors. A first stepper motor 720 is used to rotate the presentation platform in angle with respect to the shuttle carriage support arm 704. A second stepper motor 730 is utilised to drive the position of the shuttle carriage arm 704 with respect to the position of the shuttle carriage support 702. A third stepper motor 740 is utilised to drive the various gears and belts supported within the presentation platform which locate and/or grasp items of media presented at the input/output orifice 701.

Figure 8:
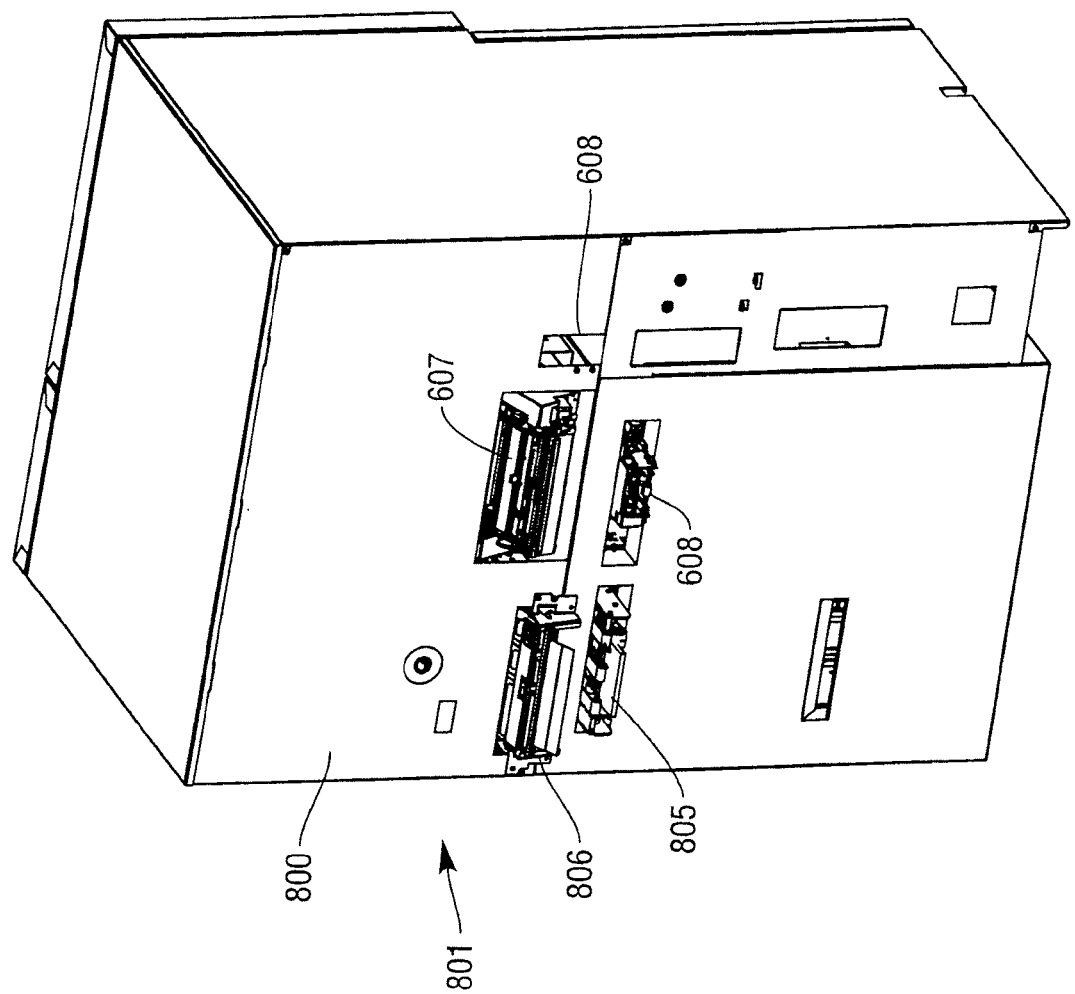
FIG. 8 illustrates a view of a multi-media station with multiple handling ports.

FIG. 8 illustrates how a traditional carcass of an ATM can provide a multi-media station according to certain embodiments of the present invention. It will be appreciated that rather than utilise a traditional carcass, a bespoke housing along with the shuttle housing etc and user interface can be supplied to provide an ATM.

As illustrated in FIG. 8, the carcass 800 used to provide the multi-media station has a back region 801 which includes multiple handling ports. For example, a lower currency handling port 805 and upper statement/receipt port 806. Also, a passbook handling port 607 and further auxiliary ports 608 which may be used for dispensing and/or depositing items of media such as coins or further sheet-like items.

Figure 9:
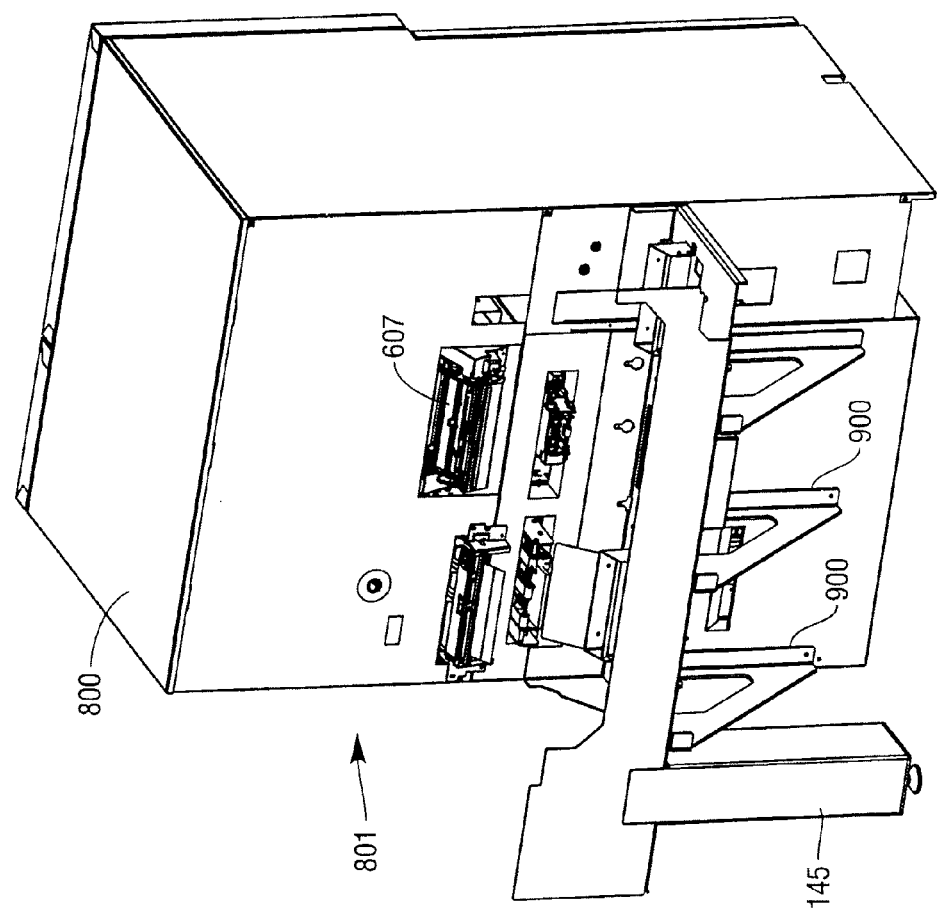
FIG. 9 illustrates the construction of a beam assembly for carrying a shuttle carriage.

FIG. 9 helps illustrate how a user interface and shuttle system may be retrofitted to the traditional carcass 800 shown in FIG. 8, according to certain embodiments of the present invention. The shuttle housing 130 is secured to the rear 801 of the multi-media station and duly supported on the leg 145. Further brackets 900 may be affixed to the shuttle housing to enable the housing to support the shuttling system and user interface.

Figure 10:
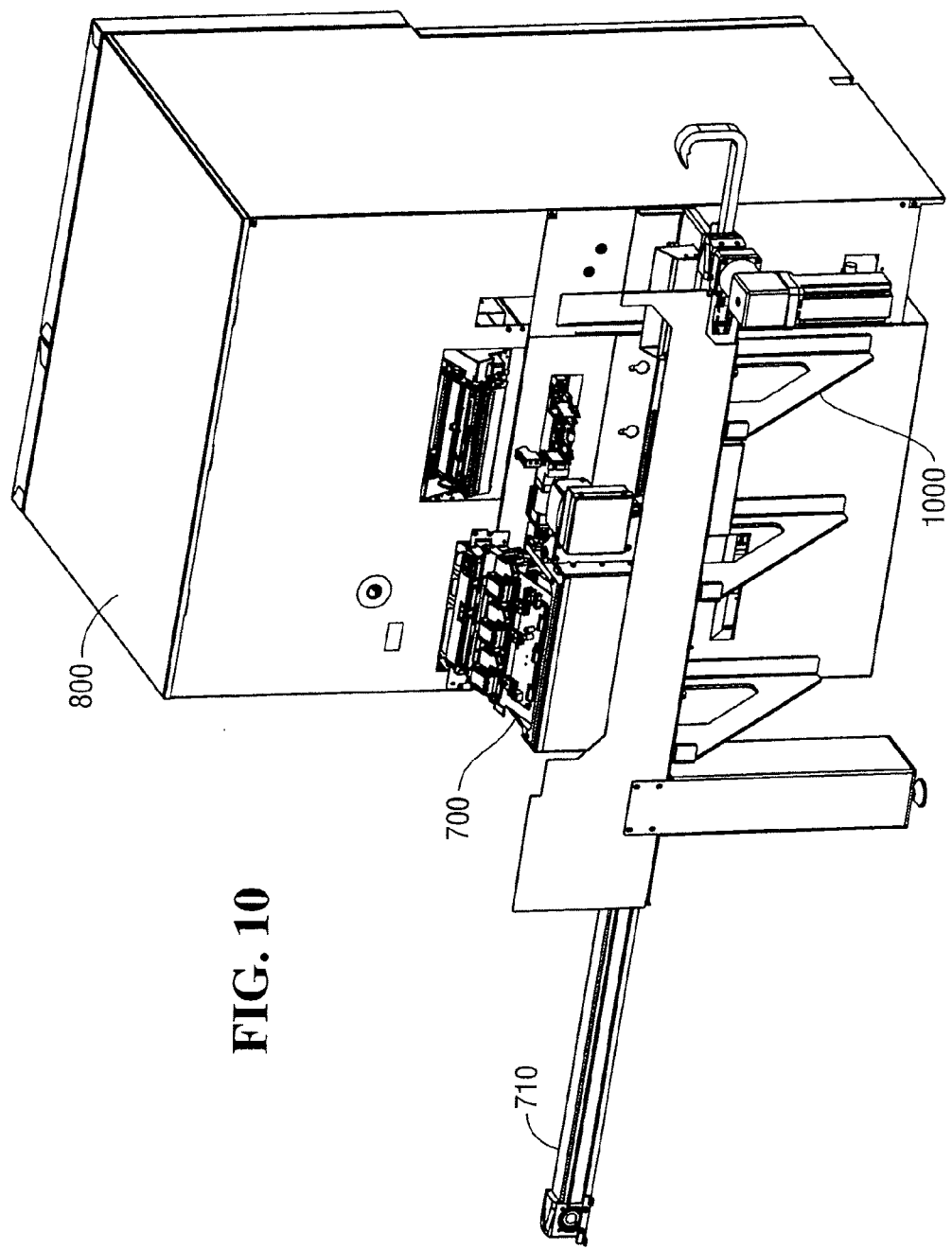
FIG. 10 illustrates a transport and shuttle and drive rail assembled onto the device shown in FIG. 9.

FIG. 10 helps illustrate how the drive rail 710 may thereafter be secured to the shuttle housing and a motor 1000 may be connected to drive the shuttle carriage along the drive rail 710. The shuttle motor 1000 ultimately is encased in a shuttle motor housing 330.

Figure 11:
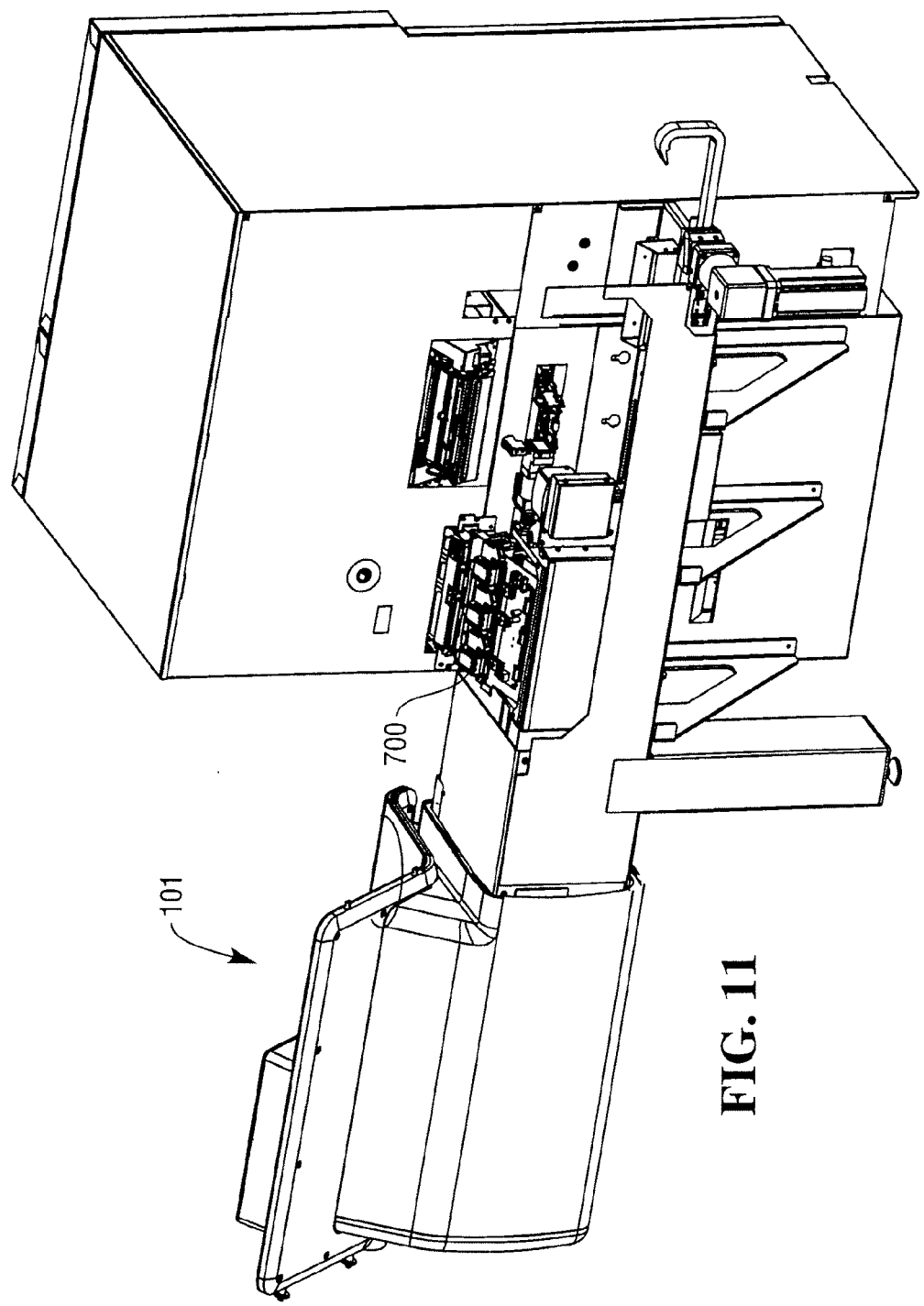
FIG. 11 illustrates an assembled user interface and associated multi-media station.

FIG. 11 illustrates how a user interface 101 is thereafter secured to an end of the shuttle housing. FIGS. 10 and 11 illustrate the location of the presentation platform 700 in a tilted mode within the bay area at the rear of the multi-media station. In this position, the input/output port 701 of the presentation platform is aligned with the upper handling port at the rear of the carcass. Subsequent to transfer of items of media from the presentation platform to the selected port or from the selected handling port to the presentation platform, the tilt is removed from the platform and then the shuttle carriage is driven along the drive rail 710 to within the body of the user interface 101. Thereafter, the input/output port 701 of the presentation platform is aligned with the port 105 of the user interface to dispense items of media. It will be appreciated by those skilled in the art that when a user makes a deposit at the user interface 101, the deposited items of media, whether they be a single item of media or multiple items of media, are located through the media port 105 in the user interface whereby they are duly located in the port 701 of the presentation platform which is previously duly aligned in position. Thereafter, the shuttle carriage is driven along a drive rail towards the bay at the back of the multi-media station whereby the presentation platform is aligned laterally and/or vertically and/or through a θ angle with a selected one of the possible handling ports associated with the type of media being deposited/transaction type.

Certain embodiments of the present invention thus increase the range of features and functionality offered within a self-service terminal. Certain embodiments of the present invention provide a bolt on shuttle system that allows a traditional self-service cabinet to be used as a platform for a highly simplified customer front end featuring a single slot media port. The bolt on shuttle system can deliver mixed media to a customised front end which can satisfy branding, customer experience, usability and technology tracking. The bolt on aspect of the invention may be applied to a multi-vendor type installation.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. Apparatus for conveying at least one item of media between a media port of a user interface and a selected one of a plurality of possible handling ports of a multi-media station which is housed in a security cabinet separate and physically spaced apart from the user interface, the apparatus comprising:
   a shuttle drive rail encased in a shuttle housing including (i) a first end region which is located in a public access room where a public user of the user interface can stand and interact with the user interface, and (ii) a second end region which is located in a restricted access room, separate and laterally spaced apart from the first end region by a secure wall, where a restricted user can stand and interact with the multi-media station, wherein the shuttle drive rail and shuttle housing are adapted to pass through a hole in the secure wall that separates the first end region and the second end region; and
   a shuttle carriage supporting a presentation platform and movable along the shuttle drive rail within the shuttle housing between the first end region to align the presentation platform with the media port of the user interface and the second end region to align the presentation platform with the selected one of the plurality of possible handling ports of the multi-media station and thereby to enable the at least one media item to be conveyed between the media port of the user interface and the selected one of the plurality of possible handling ports of the multimedia station;
   wherein the presentation platform has (i) a first direction of possible motion horizontally along a longitudinal axis which extends between the first end region of the shuttle drive rail and the second end region of the shuttle drive rail, (ii) a second direction of possible motion vertically perpendicular to the horizontal motion, and (iii) a third direction of possible motion angularly tilting about a central longitudinal axis of the presentation platform which extends substantially parallel to the longitudinal axis extending between the first end region of the shuttle drive rail and the second end region of the shuttle drive rail.

2. The apparatus as claimed in claim 1, wherein the shuttle housing defines a shuttle bay in which the shuttle carriage and shuttle drive rail are housed and that including (i) a first end portion on which the user interface is supported, and (ii) a second end portion at which the shuttle housing can be secured to an exterior surface of the security cabinet and wherein the second end portion includes a moveable lid to provide access to the handling ports of the multimedia station.

3. The apparatus as claimed in claim 1, further comprising:
   a support leg extending from the shuttle housing that and adjustable vertically along the second direction of possible motion to support the shuttle housing and the user interface at a desired distance above a floor surface.

4. The apparatus as claimed in claim 1, wherein the shuttle carriage comprises at least one (i) a first servo motor for driving the shuttle carriage in the first direction of possible motion to horizontally position the presentation platform along the shuttle drive rail, (ii) a second stepper motor for locating the presentation platform in the second direction of possible motion to vertically position the presentation platform at a desired height above the shuttle drive rail, and (iii) a third stepper motor for locating the presentation platform in the third direction of possible motion to angularly position the presentation platform at a desired angle with respect to a horizontal plane which extends along the first direction of possible motion.

5. An automated teller machine (ATM) comprising:
   an ATM customer interface comprising a media port and an ATM customer display;
   an ATM multi-media station which is housed in an ATM security cabinet separate and physically spaced apart by a secure wall from the ATM customer interface;
   a shuttle drive rail encased in a shuttle housing including (i) a first end region which is located at the ATM customer interface, and (ii) a second end region which is located at the ATM multi-media station; and
   a shuttle carriage supporting a presentation platform and movable along the shuttle drive rail within the shuttle housing between the first end region to align the presentation platform with the media port of the ATM customer interface and the second end region to align the presentation platform with a selected one of the plurality of possible handling ports of the ATM multimedia station and thereby to enable at least one media item to be conveyed between the media port of the ATM customer interface and the selected one of the plurality of possible handling ports of the ATM multi-media station, wherein the shuttle drive rail and shuttle housing is adapted to pass through a hole in the secure wall that separates the first end region and the second end region, and wherein the presentation platform has (i) a first direction of possible motion horizontally along a longitudinal axis which extends between the first end region of the shuttle drive rail and the second end region of the shuttle drive rail, (ii) a second direction of possible motion vertically perpendicular to the horizontal motion, and (iii) a third direction of possible motion angularly tilting about a central longitudinal axis of the presentation platform which extends substantially parallel to the longitudinal axis extending between the first end region of the shuttle drive rail and the second end region of the shuttle drive rail, wherein the secure wall separates a public access room where a public user of the user interface can stand and interact with the user interface from a restricted access room where a restricted user can stand and interact with the ATM security cabinet.

6. The ATM as claimed in claim 5, wherein the shuttle carriage comprises (i) at least one a first servo motor for driving the shuttle carriage in the first direction of possible motion to horizontally position the presentation platform along the shuttle drive rail, (ii) at least one a second stepper motor for locating the presentation platform in the second direction of possible motion to vertically position the presentation platform at a desired height above the shuttle drive rail, and (iii) at least one a third stepper motor for locating the presentation platform in the third direction of possible motion to angularly position the presentation platform at a desired angle with respect to a horizontal plane which extends along the first direction of possible motion.

7. The ATM as claimed in claim 5, wherein the ATM security cabinet comprises a front end of a carcass of an ATM.

8. The ATM as claimed in claim 5, wherein the media port of the ATM customer interface comprises only one media port.

9. The ATM as claimed in claim 5, wherein the plurality of handling ports of the ATM multi-media station comprises (i) at least one printed receipt port, (ii) at least one currency dispensing port, and (iii) at least one item deposit port.

10. An automated teller machine (ATM) comprising:
   an ATM security cabinet including (i) interior cabinet surfaces which define an interior cabinet chamber within the ATM security cabinet, and (ii) exterior cabinet surfaces which face away from the interior cabinet chamber within the ATM security cabinet;
   an ATM multi-media station housed in the interior cabinet chamber within the ATM security cabinet and having a back side with a plurality of possible handling ports through which media items can pass;
   an ATM customer interface separate and physically spaced apart from the exterior cabinet surfaces of the ATM security cabinet and including an ATM customer display and a back side with a media port through which media items can pass; and
   a shuttle system running laterally between and interconnecting the back side of the ATM customer interface and the back side of the ATM multi-media station housed in the interior cabinet chamber of the ATM security cabinet to enable media items to be conveyed between the media port of the ATM customer interface and a selected one of the plurality of possible handling ports of the ATM multi-media station, wherein the shuttle system comprises (i) a shuttle housing having interior housing surfaces which define a shuttle bay and having exterior housing surfaces which face towards at least some of the exterior cabinet surfaces of the ATM security cabinet, (ii) a shuttle drive rail disposed in the shuttle bay and including a first end region and a second end region opposite the first end region, wherein the shuttle drive rail is adapted to pass through a hole in a secure wall that separates the first end region and the second end region, and (iii) a shuttle carriage disposed in the shuttle bay and supporting a presentation platform and movable along the shuttle drive rail between the first end region to align the presentation platform with the media port of the ATM customer interface and the second end region to align the presentation platform with the selected one of the plurality of possible handling ports of the ATM multi-media station and thereby to enable a media item to be conveyed between the media port of the ATM customer interface and the selected one of the plurality of possible handling ports of the ATM multi-media station, wherein the secure wall separates a public access room where a public user of the ATM customer user interface can stand and interact with the user interface from a restricted access room where a restricted user can stand and interact with the ATM multi-media station.

11. The ATM as claimed in claim 10, wherein the ATM security cabinet comprises a front end of a carcass of an ATM.

12. The ATM as claimed in claim 10, wherein the media port of the ATM customer interface comprises only one media port.

13. The ATM as claimed in claim 10, wherein the plurality of handling ports of the ATM multi-media station comprises (i) at least one printed receipt port, (ii) at least one currency dispensing port, and (iii) at least one item deposit port.

14. The ATM as claimed in claim 10, wherein the shuttle system comprises
   a support leg extending from the shuttle housing and adjustable vertically along the second direction of possible motion to support the shuttle housing and the ATM customer interface at a desired distance above a floor surface.

* * * * *